United States Patent [19]

Suzuki et al.

[11] 4,304,434
[45] Dec. 8, 1981

[54] HARD TOP AUTOMOBILE BODY WITH A REINFORCING PILLAR

[75] Inventors: Ichiro Suzuki, Nagoya; Kunihiko Masaki, Toyota; Toshio Kawamura, Nagoya, all of Japan

[73] Assignee: Toyota Jidosha Kogyo Kabushiki Kaisha, Japan

[21] Appl. No.: 102,435

[22] Filed: Dec. 11, 1979

[30] Foreign Application Priority Data

Mar. 19, 1979 [JP] Japan .............................. 54/35335[U]

[51] Int. Cl.³ ............................................. B62D 25/02
[52] U.S. Cl. ..................................... 296/195; 296/146
[58] Field of Search ............... 296/185, 187, 195, 201, 296/203, 29, 146

[56] References Cited

U.S. PATENT DOCUMENTS 1,629,278  5/1927  Lambert ................................ 296/29
2,583,781  1/1952  Lindsay ............................... 296/201

Primary Examiner—Joseph F. Peters, Jr.
Assistant Examiner—Ross Weaver
Attorney, Agent, or Firm—Birch, Stewart, Kolasch & Birch

[57] ABSTRACT

In a hard top automobile body having a roof, and a rear quarter pillar, and a lower rear side portion, a reinforcing pillar, substantially separate from the rear quarter pillar. The reinforcing pillar is provided at a position shifted toward the front of the automobile from the rear quarter pillar, with its upper and lower ends attached to the side of the roof and the lower rear side portion, respectively. In this manner it divides the rear quarter opening into two, while allowing the rear quarter pillar to be reduced to a thinner structure so as to provide better rear side view for the driver without sacrificing the strength and rigidity of the automobile body.

5 Claims, 5 Drawing Figures

HARD TOP AUTOMOBILE BODY WITH A REINFORCING PILLAR

BACKGROUND OF THE INVENTION

The present invention relates to an automobile body, and, more particularly, relates to a hard top automobile body.

In the conventional construction of a hard top automobile body, which includes a roof, a rear quarter pillar, and a lower rear side portion, the side edge of the roof, the rear quarter pillar, and the upper edge of the lower rear side portion define between them a rear quarter opening, the rear quarter opening being fitted with a window glass, enorder to ensure the necessary strength and rigidity of the automobile body, it has been customary to construct the rear quarter pillar as rather strong and thick. This, however, has caused a problem in that this quarter pillar has a tendency to obstruct the view in the rear side direction which is available to the driver of the automobile. This restriction of the driver's field of view, creates a so-called "blind spot", which is dangerous and unacceptable.

As an expedient to cope with this problem, it has been proposed, and practiced, to provide a small hole pierced through the quarter pillar, and to fit a fixed glass in this hole. In this case, depending on this body construction, it is possible for the driver to see through this hole and through the central part of the rear quarter pillar. However, this construction still does not provide a good rear side view, and this solution to the problem must be regarded as not very satisfactory.

SUMMARY OF THE INVENTION

The object of the present invention, therefore, in order to cope with such problems, is to provide a construction for a hard top automobile body which has the necessary strength and rigidity and, nevertheless, obviates the need for a thick rear quarter pillar which severely obstructs the rear side view of the driver so as to create a blind spot.

This, and other, objects are achieved, according to the present invention, by a hard top automobile body, comprising: a roof; a rear quarter pillar; and a lower rear side portion; the side edge of the roof, the rear quarter pillar, and the upper edge of the lower rear side portion defining between them a rear quarter opening; the present invention it further comprises a reinforcing pillar, substantially separate from the rear quarter pillar, and situated so as to traverse the rear quarter opening at a position shifted in the direction of the front of the automobile from the rear quarter pillar, with its upper end joining to the side of the roof and with its lower part joining to the lower rear side portion, so that it divides the rear quarter opening into a front portion and a rear portion.

By constructing an automobile body in this fashion, with a reinforcing pillar which is made of a member substantially separate from the rear quarter pillar, and which is displaced therefrom towards the front of the body of the automobile, and which therefore may be rather thin and yet strong, it is possible at one and the same time to guarantee the strength and rigidity of the automobile body by this reinforcing pillar, and also to make the rear quarter pillar of the automobile much thinner. Therefore, no substantial blind spot exists as far as the automobile driver's rear side view is concerned.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are provided purely for the purposes of illustration and exemplification only, and are in no way to be taken as limitative of the scope of the present invention, which, as well as the protection desired to be provided by Letters Patent, is to be defined solely by the accompanying claims.

In the drawings.

DESCRIPTION OF THE PREFERRED EMBODIMENTS

Figure 1:
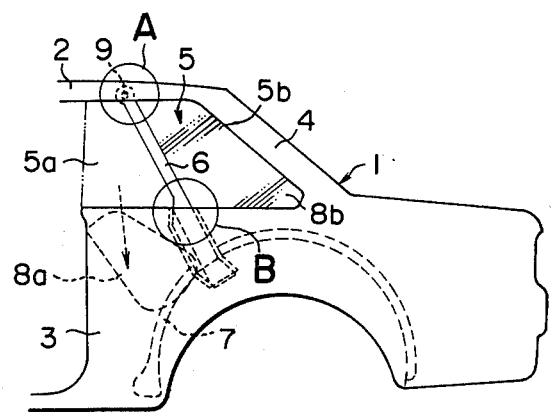
FIG. 1 is a somewhat schematic side view of an automobile body which is a first and schematic embodiment of the present invention, showing only those parts which are necessary to be understood for a proper apprehension of the principles of the present invention.

Referring first to FIG. 1, the reference numeral 1 denotes generally the entire body of the automobile, and this automobile body 1 comprises a roof portion 2, a lower rear side portion 3, and a rear quarter pillar 4. Between them, by their co-operation, the roof 2, the lower rear side portion 3, and the rear quarter pillar 4 define a rear quarter opening, generally designated by 5.

According to the present invention, the illustrated automobile body is provided with a reinforcing pillar 6, and by virtue of this the rear quarter pillar 4 is made substantially thinner than the conventional one, while providing larger opening area of the opening 5. This reinforcing pillar 6 is separate from the rear quarter pillar 4 and is situated towards the direction of the front of the automobile from the rear quarter pillar 4. The upper end of the reinforcing pillar 6 is attached to the side of the roof portion 2. The lower end of the reinforcing pillar 6 is attached to the lower rear side portion 3, of the automobile body 1. In the shown embodiment, the lower part of the reinforcing pillar 6, which is attached to the upper edge of the lower rear side portion 3, further extends downward from this attaching construction, and is joined to the wheel arch 7 of the automobile. This ensures further strength for the general attachment of the reinforcing pillar to the lower portion 3.

Thus, this reinforcing pillar 6 divides the rear quarter opening 5 into a forward part 5a and a rear part 5b. In the shown embodiment, the rear part 5b is fitted with a fixed window glass 8b, and the front part 5a is fitted with a window glass 8a, which is movable up and down by a window glass raising and lowering mechanism, which is not shown in the figure. Of course, in an alternative embodiment, this front part window glass 8a could be fixed, and not movable.

Figure 2:
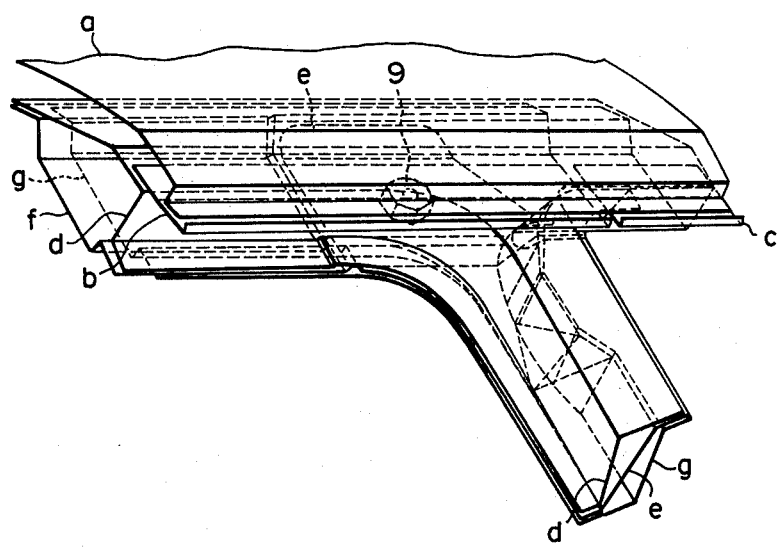
FIG. 2 is an illustration showing, at an enlarged scale, from an oblique side angle, the part of the construction which is surrounded by the circle A in FIG. 1, and illustrating the connection of the upper end of the reinforcing pillar to the side of the roof of the automobile body.
Figure 3:
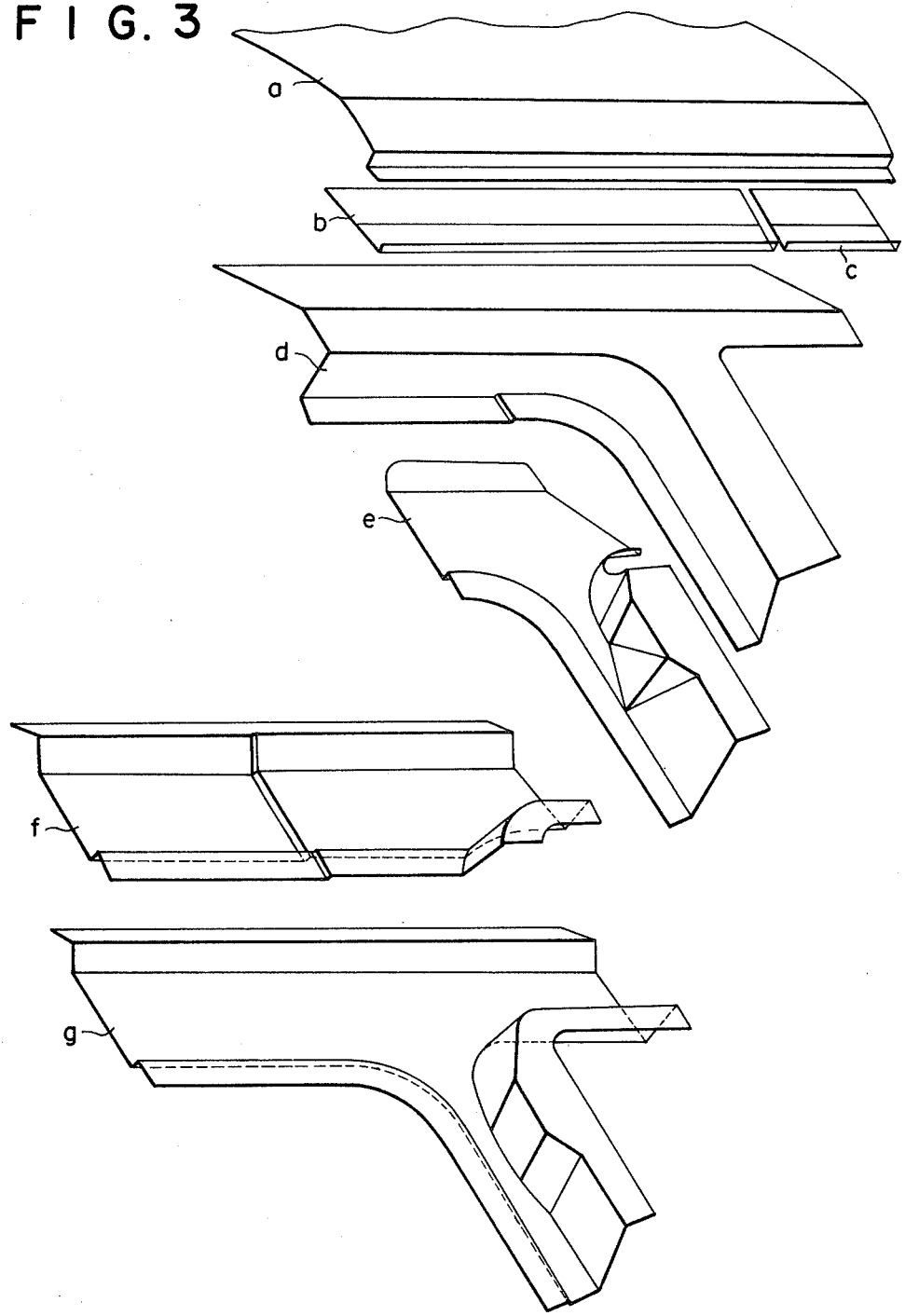
FIG. 3 is a view from the same angle as FIG. 2, showing the various parts in FIG. 2, in an exploded view, taken apart so that their construction and mutual cooperation can be better seen.

FIG. 2 shows at an enlarged scale, from an oblique side angle, an embodiment of the part of the construction which is surrounded by the circle A in FIG. 1. This figure illustrates the connection of the upper end of the reinforcing pillar 6 to the side of the roof 2 of the automobile body 1. Further, FIG. 3 is a view from the same angle as FIG. 2, showing the various parts in FIG. 2 in an exploded view, taken apart so that their construction and mutual co-operation can be better seen and understood. In FIGS. 2 and 3, the same parts bear the same reference characters (a, b, c, d, e, f, g). It will be apparent to a man of ordinary skill in the automobile body construction art, based upon the above description, how these parts are formed, and how the upper end of the reinforcing pillar 6 is joined to the side of the roof 2.

Figure 4:
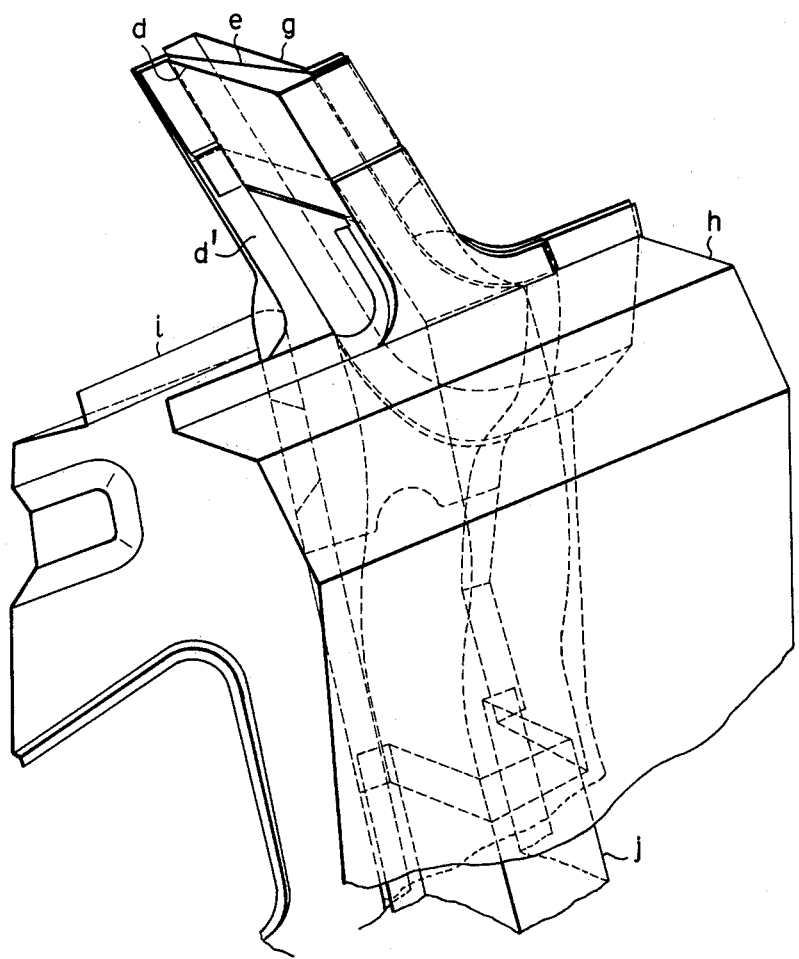
FIG. 4 is a view showing, at an enlarged scale, from an oblique side angle, the part of the construction in FIG. 1 which is surrounded by the circle B, and illustrating the connection of the lower part of the reinforcing pillar to the upper edge of the lower rear side portion of the automobile body.
Figure 5:
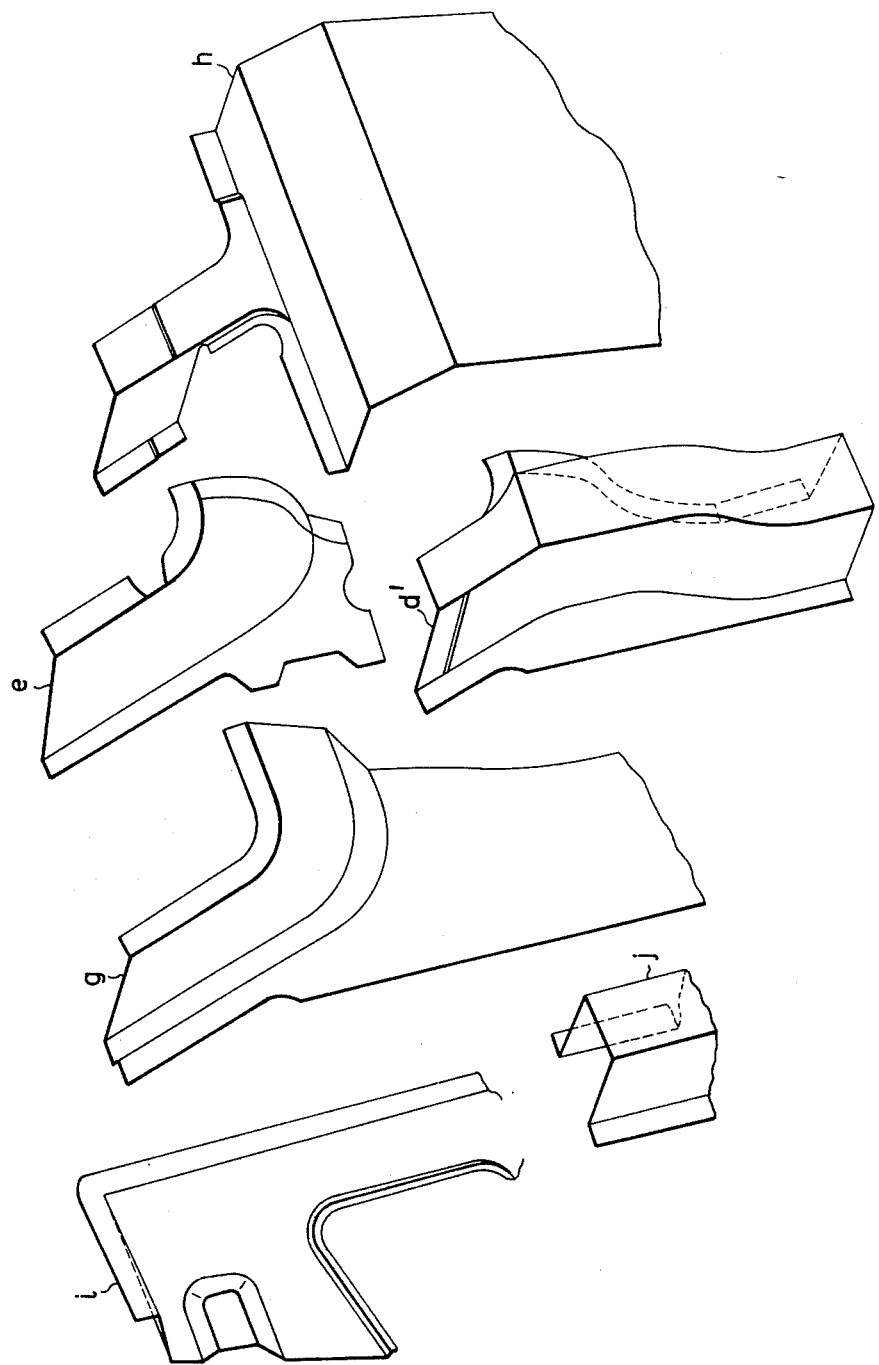
FIG. 5 is a view from the same angle as FIG. 4, showing the various parts in FIG. 4, in an exploded view, taken apart so that their construction and mutual cooperation can be better seen and understood.

Further, FIG. 4 shows at an enlarged scale, from an oblique side angle, an embodiment of the part of the construction in FIG. 1 which is surrounded by the circle B. This figure illustrates the connection of the lower part of the reinforcing pillar 6 to the upper edge of the lower rear side portion 3. Further, FIG. 5 is a view from the same angle as an exploded view, taken apart so that their construction and mutual cooperation can be better seen and understood. Again, in FIGS. 4 and 5, the same parts are designated by the same reference characters (d, d', e, g, h, j, l). It will be clear to a person of ordinary skill in the automobile body construction art, based upon the above description, how these parts are formed, and how the reinforcing pillar 6 is joined to the upper edge of the lower rear side portion 3.

As will be clear from the figures, and the accompanying explanation, because the reinforcing pillar 6 is made of members which are substantially separate from those which construct the rear quarter pillar, it is possible to make the reinforcing pillar to have optionally high strength and rigity, free from the constructional and design limitations imposed on the rear quarter pillar, and to make, in turn, the rear quarter pillar 4 much thinner than has heretofore been possible, in this manner the strength of the rear quarter pillar 4 which has been lost by making it thinner, is adequately made up for and compensated by the reinforcing pillar 6, so that the overall required automobile body rigidity and strength are maintained.

In FIGS. 1 and 2, the reference numeral 9 denotes a seat belt anchoring point which is mounted to the portion where the reinforcing pillar 6 is joined to the side of the roof 2. This construction has the added advantage that the seat belt reinforcing point 9 is mounted more strongly and firmly than if it were merely attached to the side of the roof 2, because, in this case, the reinforcing pillar operates as a strut member which definitely supports the upper end of the belt against the downward force applied thereto.

Although the present invention has been shown and described in terms of some preferred embodiments thereof, and in language more or less specific with regard to structural features thereof, and with reference to the illustrative drawings, it should be understood that in any particular embodiment of the present invention various changes, modifications, and omissions of the form and the detail thereby can be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

We claim:

1. A hard top automobile body, comprising:
 a roof portion having side edge portions along opposite sides thereof;
 a pair of lower rear side wall portions, each having an upper edge portion extending substantially horizontally; and
 a pair of rear quarter pillar portions, each connecting the rear end of one of said side edge portions of said roof portion to one of said lower rear side wall portions at the rear end of said upper edge portion;
 said side edge portion of said roof portion, said rear quarter pillar portion and said upper edge portion of said lower rear side wall portion defining between them a rear quarter opening;
 characterized in that:
 said hard top automobile body further includes a pair of reinforcing pillar portions constructed separately from said roof portion, said lower rear side wall portion and said rear quarter pillar portion, each of said reinforcing pillar portions being positioned so as to traverse substantially vertically a middle portion of said rear quarter opening, with an upper end of said reinforcing pillar being mounted to said side edge portion of said roof portion and with a lower part of said reinforcing pillar being mounted to said lower rear side wall portion, so that said reinforcing pillar divides said rear quarter opening into a front portion and a rear portion while adding strength and rigidity to said hard top automobile body thereby permitting the thickness of the rear quarter pillars to be reduced.

2. A hard top automobile body according to claim 1, wherein the reinforcing pillar is assembled from angle members, at least one of which has a T-shaped end portion which includes a transverse bar portion which is incorporated in the side edge of the roof.

3. A hard top automobile body according to claim 1, further comprising a wheel arch, wherein the lower end of the reinforcing pillar includes a portion which is joined to the wheel arch.

4. A hard top automobile body according to any one of claims 2, 3, or 1, further comprising a front quarter glass which is fitted to the front portion of the rear quarter opening and a rear quarter glass which is fitted to the rear portion of the rear quarter opening.

5. A hard top automobile body according to claim 4, wherein the rear quarter glass is fixed, and the front quarter glass is movable up and down.

* * * * *